United States Patent [19]

Hough et al.

[11] 4,150,097

[45] Apr. 17, 1979

[54] METHOD FOR THE SYNTHESIS OF BORAZINE

[75] Inventors: William V. Hough, Butler; Clarence R. Guibert, Mars; Gerald T. Hefferan, Butler, all of Pa.

[73] Assignee: Mine Safety Appliances Company, Pittsburgh, Pa.

[21] Appl. No.: 891,501

[22] Filed: Mar. 30, 1978

[51] Int. Cl.² ............................................. C01B 35/14
[52] U.S. Cl. .................................................. 423/285
[58] Field of Search ............................. 423/284, 285; 260/606.5 B

[56] References Cited

PUBLICATIONS

Stock, A.; *Hydrides of Boron and Silicon;* Cornell Univ. Press; Ithaca, N.Y.; 1957; pp. 92–93.
Niedenzu, K. et al., *Boron–Nitrogen Compounds;* Academic Press, N.Y.; 1965; pp. 86–88.

*Primary Examiner*—G. O. Peters
*Attorney, Agent, or Firm*—Reed, Smith, Shaw & McClay

[57] ABSTRACT

A method for synthesizing borazine by preparing a liquid mixture of ammonia borane and a high boiling point solvent which is inert to ammonia borane, and heating said mixture to obtain borazine and hydrogen. Volatized borazine is stripped from the hydrogen during synthesis and any borazine entrained in the solvent is removed by distillation.

5 Claims, No Drawings

METHOD FOR THE SYNTHESIS OF BORAZINE

FIELD OF THE INVENTION

The present invention relates to a method for the preparation of borazine and in particular to a method for the preparation of borazine by pyrolysis of ammonia borane.

BACKGROUND OF THE INVENTION

It has been known for many years that borazine, $(BHNH)_3$, decomposes at high temperatures to provide a source of high purity boron nitride which is used as an alloying agent, in the manufacture of semiconductors and the like. However, methods for synthesizing borazine have not resulted in commercially significant yields or quantities.

Various methods of synthesis include the thermal decomposition of boron hydride-ammoniates, where $B_2H_6 \cdot 2NH_3 \rightarrow B_3N_3H_6 + H_2$, to provide yields of about 50%, but only in small quantities. Also, borazines are produced by reacting ammonium chloride and trichloroborane to form B-trichloroborazine which is reduced by lithium or sodium hydroborate. High purity borazine can be difficult to obtain because of residual chlorine impurities and complex purification procedures. Borazine can be produced without a solvent using a lithium borohydride and ammonium chloride by adhering to specific operating conditions to obtain up to 42% yields but only in quantities up to about 20–30 grams. Numerous other methods have been proposed, but none of the methods provide useful (pound) quantities of borazine.

Accordingly, it is an object of the present invention to provide a method for obtaining borzine in significantly greater quantities than previously available. It is a further object of the present invention to provide a method for the continuous or batch production of high purity borazine.

SUMMARY OF THE INVENTION

Generally, the present invention comprises dissolving ammonia borane ($NH_3BH_3$) in an inert solvent having a relatively high boiling point and heating the solution. The volatile products are collected and borazine is separated therefrom.

Preferably, ammonia borane is dissolved in a solvent such as glycol ether, diethylene glycol dimethylether, triethylene glycol dimethyl ether, tetraethylene glycol dimethyl ether, or the like which is inert to ammonia borane and has a boiling point of from 100° C. to 250° C. and preferably above 160° C. The ratio of dissolved ammonia borane to solvent is from between 1:1000 and 22:100 (the solubility range) and preferably from about 1:100 to 5:100. The solution is heated to a temperature of between 100° C. to 160° C. and the borazine is separated from occluded solvent by vacuum condensation or distillation.

In the case of a continuous process, a solution of ammonia borane and solvent, such as glycol ether is heated and agitated while flowing through a vertical reactor tube. Normally, it is necessary to separate the greater portion of the solvent from the volatile products by maintaining the discharge end, for example of a vertical reactor tube, at a temperature lower than the boiling point of the solvent but higher than the boiling point of borazine. Accordingly, it is preferable to utilize a solvent having a boiling point at least 100° C. greater than that of borazine (55° C.) but not less than 100° C. The borazine can be thereafter separated from the volatiles by distillation or vacuum condensation.

In the continuous production of borazine in accordance with the present invention, it is preferable to remove as much borazine occluded in the solvent as possible. Otherwise, such borazine will be destroyed when the solvent is recycled. Preferably, this is achieved most easily by flash distillation of the borazine from the solvent.

Other advantages of the present invention will become apparent from the following examples which are illustrative of the method of the present invention.

EXAMPLE I 179 grams of distilled diethylene glycol dimethyl ether ($M_2M$) and 5 grams (0.16 mol) of ammonia borane were charged, avoiding overexposure to air, into a 500 ml round-bottom flask. After a solution formed the flask was rapidly heated to 160° C. Hydrogen was evolved and measured and the condensable volatile products were collected in a cold trap having a temperature of $-78°$ C. These products were separated by vacuum condensation and the borazine isolated to provide a yield from the reaction of 69.4%.

EXAMPLE II

A solution of 0.74 gram of ammonia borane (0.024 mol) and 45 grams of diethylene glycol dimethyl ether ($M_2M$) was added slowly via an addition funnel to 20 ml of hot (127°) stirred $M_2M$. The gaseous products and entrained $M_2M$ were passed through a $-78°$ C. cold trap where the condensable products were removed. These products were separated as in Example I and a yield of 71% was obtained.

EXAMPLE III

A solution of 15 grams of ammonia borane (0.486 mol) and 443 grams of diethylene glycol dimethyl either ($M_2M$) was passed through a heated vertical stainless steel tube with internal stiring. The mixture was heated to about 155° C. as it passed through the tube and thermally decomposed. Borazine and hydrogen that had formed exited at the top of the tube as well as liquid $M_2M$. The liquid $M_2M$ was separated from the products by a "knock-out" pot maintained at a temperature lower than the boiling point of $M_2M$, but higher than the boiling point of borazine (55° C.). As in Example I, the volatiles were collected in a cold trap and the borazine separated from the hydrogen stream. This reaction provided a borazine yield of 68.5%.

EXAMPLE IV

A solution containing 35.9 grams of ammonia borane (1.16 mol) and 1035 grams of $M_2M$ was, over a period of 20 minutes, passed through a heated vertical stainless steel reactor with internal stirring. The solution was brought to reaction temperature 150°, and thermal decomposition of $NH_3BH_3$ occurred. Borazine and hydrogen that had formed as well as liquid $M_2M$ exited at the top of the reactor and into a heat exchanger. The bulk of the $M_2M$ was removed from the more volatile products by condensation in the heat exchanger by maintaining a temperature lower than the boiling point of $M_2M$ but higher than the boiling point of borazine. The gases exiting from the top of the heat exchanger passed through a trap cooled to $-78°$ C. where the condensable products were collected. The borazine was separated from the condensables by atmospheric distillation using a 24" packed column and a Todd head to obtain a 72.9% yield of borazine.

While presently preferred embodiments of the invention have been described, the invention may be otherwise embodied within the scope of the appended claims.

What is claimed is:

1. A method for the preparation of borazine comprising dissolving ammonia borane in a solvent inert to said ammonia borane and having a boiling point of from 150° C. to 250° C. to form a solution; heating said solution to a temperature of between 100° and 160° C. to thermally decompose said solution and to evolve volatiles including hydrogen and borazine therefrom, collecting said evolved volatiles, and separating from said collected volatiles borazine.

2. A method as set forth in claim 1 wherein said solvent in a glycol either.

3. A method as set forth in claim 1 including the step of removing any borazine occluded in said solvent.

4. A method as set forth in claim 2 wherein said solution is heated to a temperature between 120° C. and 160° C.

5. A method as set forth in claim 2 wherein the ratio of ammonia borane to solvent is from 1:100 to 5:100.